(12) United States Patent
Springer

(10) Patent No.: US 12,501,001 B1
(45) Date of Patent: Dec. 16, 2025

(54) EVENT PATH GENERATION

(71) Applicant: Zoom Video Communications, Inc., San Jose, CA (US)

(72) Inventor: Shane Paul Springer, Oregon City, OR (US)

(73) Assignee: Zoom Communications, Inc., San Jose, CA (US)

( * ) Notice: Subject to any disclaimer, the term of this patent is extended or adjusted under 35 U.S.C. 154(b) by 175 days.

(21) Appl. No.: 18/134,349

(22) Filed: Apr. 13, 2023

(51) Int. Cl.
*H04N 7/15* (2006.01)
*H04L 12/18* (2006.01)

(52) U.S. Cl.
CPC ......... *H04N 7/157* (2013.01); *H04L 12/1822* (2013.01); *H04N 7/152* (2013.01)

(58) Field of Classification Search
None
See application file for complete search history.

(56) References Cited

U.S. PATENT DOCUMENTS

| | | | | |
|---|---|---|---|---|
| 11,475,635 B1 * | 10/2022 | Boufarhat | ............... | H04N 7/141 |
| 2023/0103062 A1 * | 3/2023 | Matsuzawa | ......... | H04L 12/1831 709/204 |
| 2024/0135331 A1 * | 4/2024 | Gillard | ............... | G06Q 10/1095 |

* cited by examiner

*Primary Examiner* — Hemant S Patel
(74) *Attorney, Agent, or Firm* — Kilpatrick Townsend & Stockton, LLP

(57) ABSTRACT

Example methods and systems automatically generate event paths for participants of an event. A virtual conference provider accesses a scheduled event including multiple sessions and multiple participants. The virtual conference provider extracts participant data and event data associated with the scheduled event and generates a recommendation of one or more sessions for a participant based at least in part on the participant data and the event data. The virtual conference provider provides an indication of an up-next session to the participant during a current session based on the recommendation of the one or more sessions.

16 Claims, 9 Drawing Sheets

EVENT PATH GENERATION

FIELD

The present application generally relates to virtual conferencing and more specifically relates to generating event paths for participants of an event.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
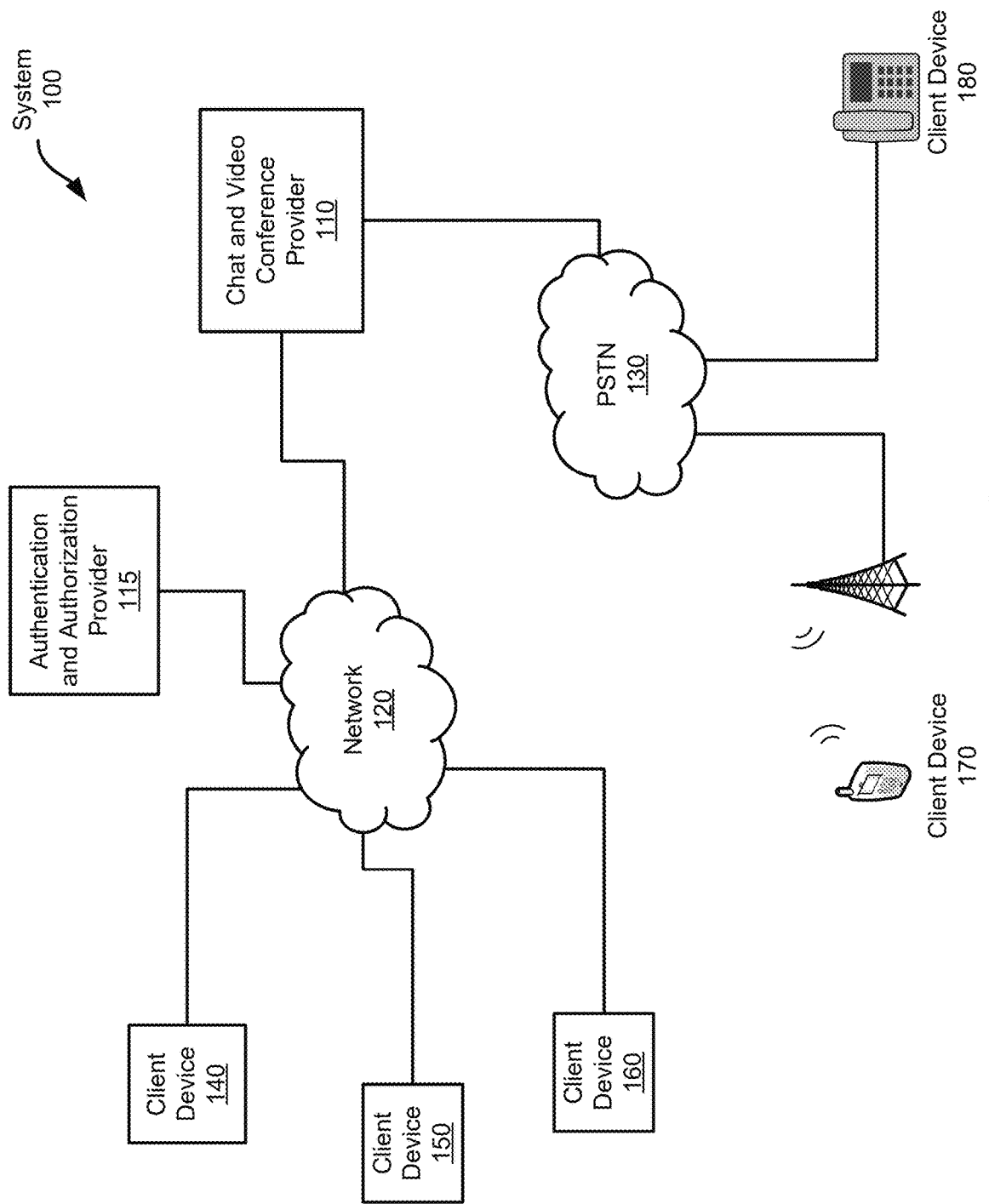
FIG. 1 shows an example system that provides videoconferencing functionality to various client devices.

Examples are described herein in the context of generating event paths for participants of an event. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

An event, such as a conference, an exposition, or a trade show, may host many different sessions over the course of one or more days, and at any given time, multiple different sessions may be on-going. These different sessions can be held completely virtually, completely in-person, or hybrid including both virtual and on-site accesses. Event participants do not need to or cannot join all the sessions. In many situations, the event participants do not have a clear guide for what sessions to join during the event. For example, when a virtual participant finishes one virtual session, the virtual participant does not know which session to join next. The virtual participant may waste time trying to find sessions to join or disengage because of lack of guidance.

To provide an actionable event path for a participant of an event, a virtual conference provider can automatically generate session recommendations based on participant data and event data. For example, an event host can schedule an event via a virtual conference application executed by a virtual conference provider. The event can be completely virtual or hybrid. The event includes multiple sessions and multiple registered participants.

The virtual conference provider can access the scheduled event and extract participant data and event data related to the scheduled event. The participant data can include user profile data provided by a participant when registering for the event. For example, the participant profile data includes organization, title, occupation, location, and other information collected when registering (e.g., answers to certain questions), related to the scheduled event or historical events. The participant data can also include participant behavior data, related to the scheduled event or historical event. The participant behavior data can include user actions. For example, the participant behavior data includes participant comments or reviews about certain sessions of the scheduled event, sign-up channels directed the participants to register for the scheduled events, participant progresses on certain sessions (e.g., what sessions a participant has finished, has not started, or exited before finishing), or participation in prior events. The participant data can also include external data, retrieved from other platforms, such as social media platforms or online marketplace platforms. The event data can include presenter data associated with the multiple sessions, titles of the multiple sessions, scheduled times of the multiple sessions, descriptions of the multiple sessions, and locations (e.g., virtual location, or physical location) of the multiple sessions.

The virtual conference provider generates a recommendation of one or more sessions, for example a list of recommended sessions, for a participant using the participant data and event data. In some examples, the virtual conference provider implements a machine learning model for generating the recommendation. The machine learning model is pre-trained with a training data set, for example past event data and past participant data as inputs and past completed sessions by past participants as optimal outputs. In some examples, the virtual conference provider groups the multiple participants based on the participant data to create one or more participant groups. The virtual conference provider can generate a list of recommended sessions for each participant group. The list of recommended sessions can be ordered by time. The list can be considered as an event path or an itinerary for each participant group of the scheduled event.

The virtual conference provider generates an indication of an up-next session to a participant during a current session based on the recommendation. In some examples, the virtual conference provider causes the indication to be displayed via a graphical user interface (GUI) on a participant device. For example, the indication is presented in a floating window at a corner of the display window for the current session from 5 minutes before the end of the current session to 5 minutes after the current session is ended. The indication can also be in a format of a text message. The indication can include a start-time of the up-next session, a location of the up-next session, a title of the up-next session, and a link to the up-next session (if it is virtual).

The virtual conference provider tracks each participant's progress on the recommended sessions. For example, the virtual conference provider tracks a completion status of each recommended session. The virtual conference provider compares the overall progress to a threshold. In some examples, the threshold includes certain requirements for the participants attending the scheduled event, for example, a total number of sessions or hours a participant is required to attend, a total number of sessions in a specific subject area that a participant is required to attend, specific compulsory sessions that a participant is required to attend. The virtual conference provider can generate a progress report for each participant including the overall progress compared to the threshold, and the completion status of each recommended session.

In some examples, the virtual conference provider dynamically updates the recommendation based on updated participant data or updated event data to generate an updated recommendation including one or more updated sessions. In turn, the virtual conference provider dynamically updates the indication of the up-next session based on the updated recommendation. For example, when a participant's profile data is updated to correct a previous error, the virtual conference provider automatically generates updated recommendations based at least in part on the updated profile data. Also, as an example, when a participant did not join one session, but has finished all the other recommended sessions, the virtual conference provider can either automatically recommend another session to replace the skipped session or do so upon request.

Thus, this example provides an actionable event path for an event participant. A list of recommended sessions is intelligently generated as a guide for the participant to navigate a scheduled event. Meanwhile, an indication of an up-next session is generated and displayed toward the end of a current session, to save time for the participant and keep the participant engaged in the event. In addition, tracking a participant's progress of the recommended sessions provides feedback to the participant and event host so that the list of recommended sessions may be updated to improvement engagement.

This illustrative example is given to introduce the reader to the general subject matter discussed herein and the disclosure is not limited to this example. The following sections describe various additional non-limiting examples and examples of generating event paths for participants of an event.

Referring now to FIG. 1, FIG. 1 shows an example system 100 that provides videoconferencing functionality to various client devices. The system 100 includes a chat and video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a chat and video conference provider 110 may supply components to enable a private organization to host private internal video conferences or to connect its system to the chat and video conference provider 110 over a public network.

The system optionally also includes one or more authentication and authorization providers, e.g., authentication and authorization provider 115, which can provide authentication and authorization services to users of the client devices 140-160. Authentication and authorization provider 115 may authenticate users to the chat and video conference provider 110 and manage user authorization for the various services provided by chat and video conference provider 110. In this example, the authentication and authorization provider 115 is operated by a different entity than the chat and video conference provider 110, though in some examples, they may be the same entity.

Figure 2:
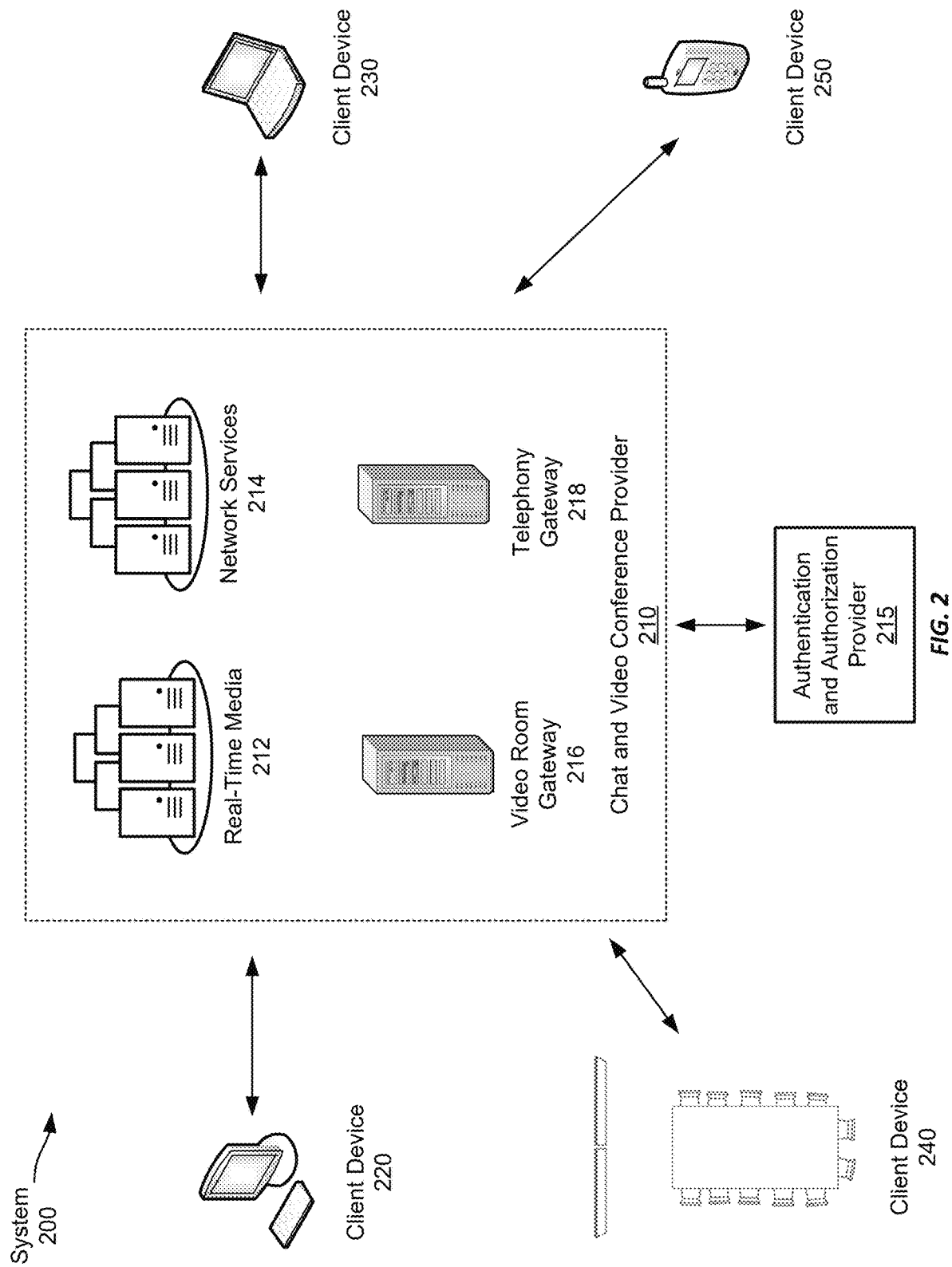
FIG. 2 shows an example system in which a video conference provider provides videoconferencing functionality to various client devices.

Chat and video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example chat and video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user authentication information, meeting identifiers, meeting passwords or passcodes, etc. In examples that employ an authentication and authorization provider 115, a client device, e.g., client devices 140-160, may operate in conjunction with an authentication and authorization provider 115 to provide authentication and authorization information or other user information to the chat and video conference provider 110.

An authentication and authorization provider 115 may be any entity trusted by the chat and video conference provider 110 that can help authenticate a user to the chat and video conference provider 110 and authorize the user to access the services provided by the chat and video conference provider 110. For example, a trusted entity may be a server operated by a business or other organization with whom the user has created an account, including authentication and authorization information, such as an employer or trusted third-party. The user may sign into the authentication and authorization provider 115, such as by providing a username and password, to access their account information at the authentication and authorization provider 115. The account information includes information established and maintained at the authentication and authorization provider 115 that can be used to authenticate and facilitate authorization for a particular user, irrespective of the client device they may be using. An example of account information may be an email account established at the authentication and authorization provider 115 by the user and secured by a password or additional security features, such as single sign-on, hardware tokens, two-factor authentication, etc. However, such account information may be distinct from functionality such as email. For example, a health care provider may establish accounts for its patients. And while the related account information may have associated email accounts, the account information is distinct from those email accounts.

Thus, a user's account information relates to a secure, verified set of information that can be used to authenticate and provide authorization services for a particular user and should be accessible only by that user. By properly authenticating, the associated user may then verify themselves to other computing devices or services, such as the chat and video conference provider 110. The authentication and authorization provider 115 may require the explicit consent of the user before allowing the chat and video conference provider 110 to access the user's account information for authentication and authorization purposes.

Once the user is authenticated, the authentication and authorization provider 115 may provide the chat and video conference provider 110 with information about services the user is authorized to access. For instance, the authentication and authorization provider 115 may store information about user roles associated with the user. The user roles may include collections of services provided by the chat and video conference provider 110 that users assigned to those user roles are authorized to use. Alternatively, more or less granular approaches to user authorization may be used.

When the user accesses the chat and video conference provider 110 using a client device, the chat and video conference provider 110 communicates with the authentication and authorization provider 115 using information provided by the user to verify the user's account information. For example, the user may provide a username or cryptographic signature associated with an authentication and authorization provider 115. The authentication and authorization provider 115 then either confirms the information presented by the user or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide authentication information to authenticate the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide account information to the chat and video conference provider 110, even in cases where the user could authenticate and employs a client device capable of authenticating the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to chat and video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a chat and video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices. etc.

Referring now to FIG. 2, FIG. 2 shows an example system 200 in which a chat and video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more authentication and authorization providers 215, which can authenticate various users to the chat and video conference provider 210 generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting an authentication and authorization provider 215 to verify the provided credentials. Once the user's credentials have been accepted, and the user has consented, the network services servers 214 may perform administrative functionality, like updating user account information, if the user has account information stored with the chat and video conference provider 210, or scheduling a new meeting, by interacting with the network services servers 214. Authentication and authorization provider 215 may be used to determine which administrative functionality a given user may access according to assigned roles, permissions, groups, etc.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may select a user to remove and issue a command through a user interface on their client device. The command may be sent to a network services server 214, which may then disconnect the selected user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
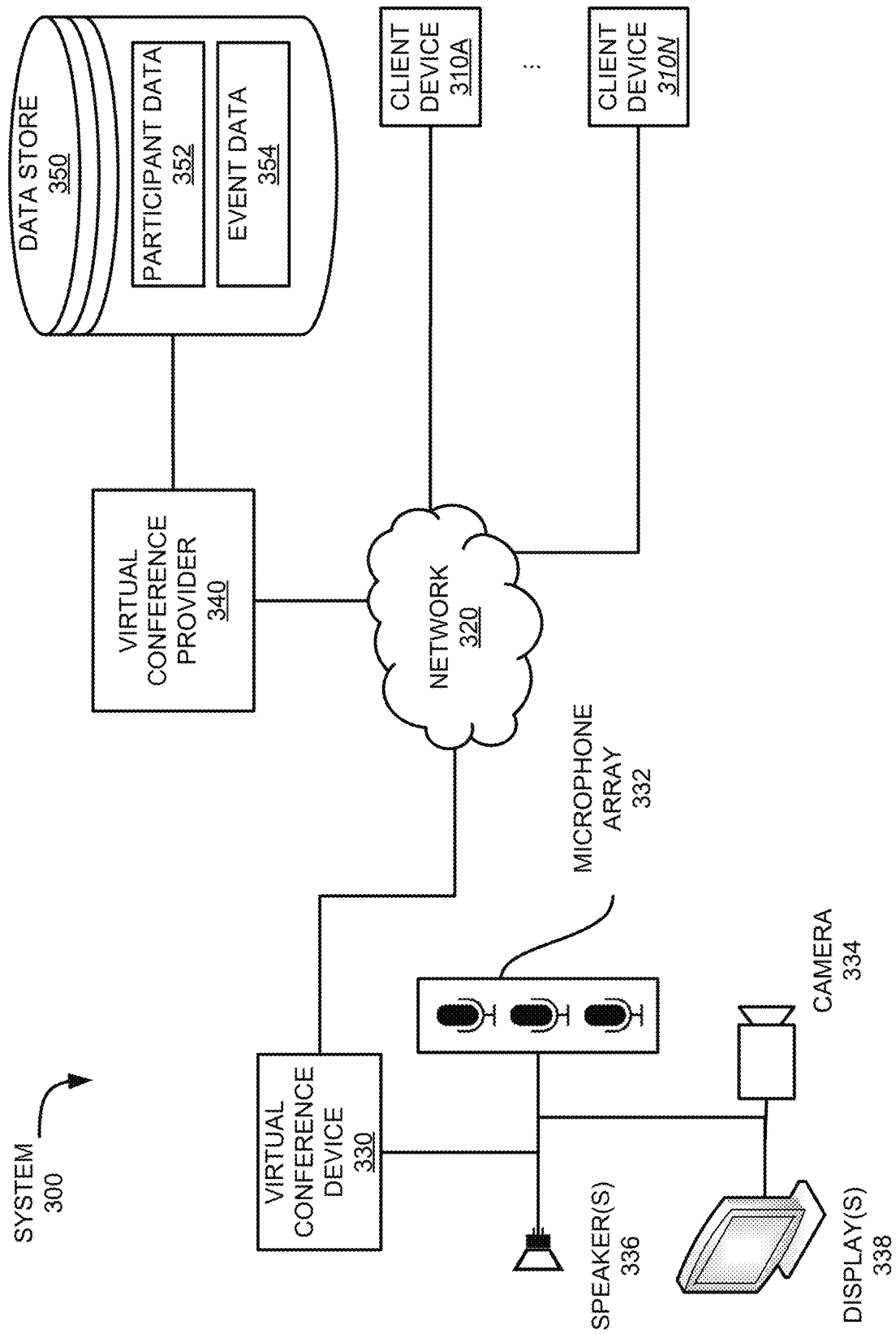
FIG. 3 shows an example system for creating a virtual session for a corresponding on-site event.

Referring now to FIG. 3, FIG. 3 shows an example system 300 for creating a virtual session. In this example system 300, a virtual conference device 330 and a number of client device 310A-310N (which may be referred to herein individually as a client device 310 or collectively as the client devices 310) are connected to a virtual conference provider 340 via a network 320. In this example, the network 320 is the internet, however, any suitable communications network or combination of communications network may be employed, including LANs (e.g., within a corporate private LAN) and WANs, similar to the network 120 illustrated in FIG. 1. The virtual conference provider 340 can be the chat and video conference provider 110 illustrated in FIG. 1 or the chat and video conference provider 210 illustrated in FIG. 2. The client devices 310 can be client devices 140-160 illustrated in FIG. 1 or client devices 220-250 illustrated in FIG. 2.

In this example, an event host can schedule an event with the virtual conference provider 340 via a virtual conference device 330. The event can be a completely virtual event. Alternatively, the event can be a hybrid event, including an on-site component for on-site participants and a corresponding virtual component for virtual participants. The virtual conference provider 340 can extract participant data 352 related to the participants of the schedule event and store participant data 352 in a data store. The virtual conference provider 340 can also extract event data 354 about the scheduled event and store the event data 354 in a data store 350. More details about the participant data 352 and the event data 354 are provided below in FIG. 4.

The virtual conference device 330 provides virtual conferencing functionality to the scheduled event. The virtual conference device 330 in this example includes a computing device, a microphone array 332, camera(s) 334, one or more speaker devices 336, and display(s) 338 installed within a conference room or an event space. While the virtual conference device 330 operates as a client device, its hardware components may be dispersed throughout an event space for a hybrid event to enable virtual participants to hear on-site participants and enable on-site participants to hear virtual participants.

The virtual conference device 330 has virtual conferencing software installed on it to enable it to connect to the virtual conference provider 340, to capture audio and video data using the microphone array 332 and camera(s) 334, and exchange audio and video streams with virtual participants via the virtual conference provider 340. While the virtual conference device 330 in some examples may include dedicated video conferencing equipment as discussed above, in other examples, it may be a conventional computing device, such as a desktop or laptop computer, or a handheld device such as a tablet or smartphone.

Similarly, each client device 310 executes a virtual conference application, which connects to the virtual conference provider 340, to join a virtual session hosted by the virtual conference device 330. During the virtual session, the various virtual participants, via their respective client devices, are able to interact with each other and on-site participants by viewing video streams and hearing audio streams from other participants, and by capturing and transmitting video and audio of themselves.

Figure 4:
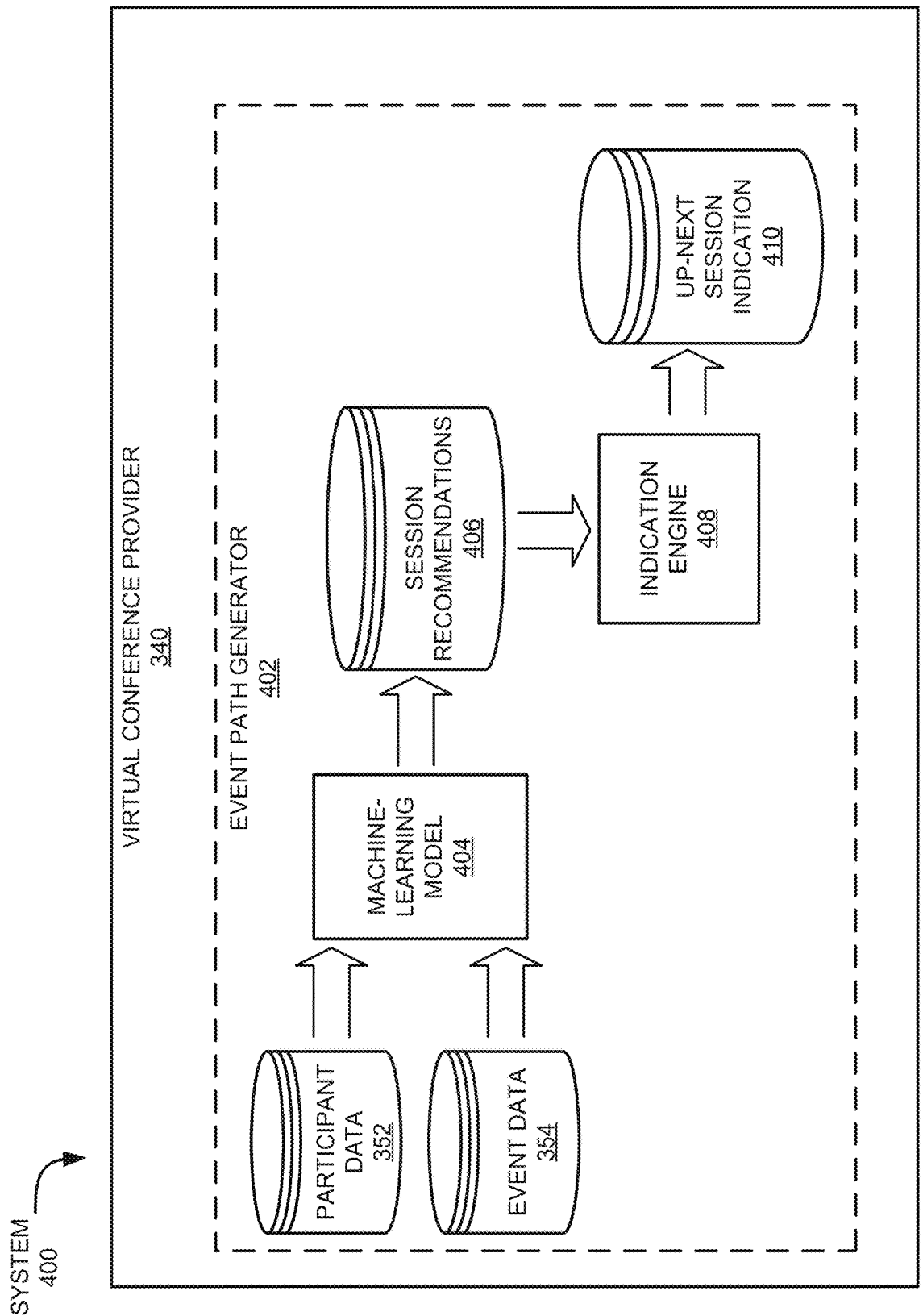
FIG. 4 shows an example system where an event path generator of a video conference provider generates session recommendations and up-next session indications.

Referring now to FIG. 4, FIG. 4 shows an example system 400 where an event path generator 402 of a virtual conference provider 340 generates session recommendations and up-next session indications. In some examples, the event path generator 402 receives a request, either from an event host or an event participant, to generate a recommended of sessions for a scheduled event. Alternatively, or additionally, the event path generator 402 automatically generates a recommendation for a participant when an event is scheduled.

In this example, the event path generator 402 implements a machine-learning model 404 for generating session recommendations. Various types of models or artificial intelligence algorithms may be used in example systems. For example, simple machine learning models, such as Linear Regression and XGboost may be used. In other examples, more sophisticated models, such as Factorization Machines ("FM"). As more data is available in a system according to these examples, deep learning models may be utilized, such as DeepFM and Wide&Deep or other similar models. Other alternative machine-learning models 404 that might be used include a deep convolutional neural networks ("CNN"), a residual neural network ("Resnet"), or a recurrent neural network, e.g. long short-term memory ("LSTM") models or gated recurrent units ("GRUs") models. The machine-learning model 404 can also be any other suitable machine-learning model, such as a three-dimensional CNN ("3DCNN"), a dynamic time warping ("DTW") technique, a hidden Markov model ("HMM"), etc., or combinations of one or more of such techniques—e.g., CNN-HMM or MCNN (Multi-Scale Convolutional Neural Network). Further, some examples may employ adversarial networks, such as generative adversarial networks ("GANs"), or may employ autoencoders ("AEs") in conjunction with machine-learning models, such as AEGANs or variational AEGANs ("VAEGANs"). Even though in this example a machine-learning model 404 is used in the event path generator 402, the event path generator 402 is not limited to using a machine learning model for generating session recommendations. The event path generator 402 can implement any suitable heuristic models for generating session recommendations 406.

In the example shown in FIG. 4, the machine-learning model 404 is trained using a training data set. The training data set includes baseline event data and baseline participant data from past events, and baseline completion status data. The baseline completion status data can include completion statuses for different sessions by participants in past events, for example "completed," "missed," "exited with 40% done," and any other suitable status that indicate the progress of the participant on a session of a past event. Through the training, the machine-learning model 404 learns the importance (e.g., weights) of both participant features and event features with respect to the likelihood a participant may interact with or complete a session. The trained machine-learning model 404 can predict a list of sessions as session recommendations 406 for a participant of the scheduled event using participant data 352 and event data 354 related to the scheduled event.

The participant data 352 used for generating session recommendations can include participant profile data, such as organization, title, occupation, location, and answers to certain questions collected at registration. The participant data 352 can also include participant behavior data, such as participant reviews or comments about certain sessions of the scheduled event, signup channels that directed the participants to register the scheduled event (e.g., promotion codes participant used, how the participants learned about the scheduled event), participant progresses (e.g., what sessions a participant has finished, has not started, or exited before finishing). The participant data can also include historical profile data and historical behavior data about corresponding participants in previous similar events hosted by the same or different host. For example, the scheduled event is a recurring event that happens every month, profile data and behavior data for the participants of the current event can also be collected as part of the participant data. The participant data can also include external data, such as profile data or behavior data, retrieved from other platforms, such as social media platforms or online marketplace platforms. Similarly, the baseline participant data used for training the machine-learning model 404 can include various types of participant data mentioned above for participants of past events, but not limited to the data related to the participants of the current event.

The event data 354 used for generating session recommendations can include presenter data associated with the multiple sessions, titles of the multiple sessions, scheduled times of the multiple sessions, descriptions of the multiple sessions, and locations (e.g., virtual location, or physical location) of the multiple sessions. Similarly, baseline event data used for training the machine-learning model 404 can include various types of event data mentioned above related to past events.

In some examples, the event path generator 402 groups the registered participants into different groups based on the participant data 352 to generate different participant groups. The event path generator 402 generates session recommendations 406 for different participant groups. The session recommendations 406 can be considered as an event path or an itinerary for a participant or a participant group in the current event. In some examples, the session recommendations 406 are a list of recommended sessions ordered by time. There can be different lists of recommended sessions, which can be referred to as different tracks, for different participant groups. The session recommendations 406 can be updated automatically or on demand when participant data 352 or event data 354 is updated.

Multiple tracks can be pre-created for different participant groups of an event at the request of the event host by the event path generator 402. Alternatively, the multiple tracks can be pre-created by the event host. When a participant is registered for the event, the event path generator can select a pre-created track for the participant based on the participant group the participant belongs to. Alternatively, or additionally, the event path generator 402 can select individual sessions for each participant to generate session recommendations as customized tracks. In some examples, the event path generator 402 selects individual sessions and meanwhile determines a pre-created track for a participant, and then generates session recommendations based on the selected individual sessions and the sessions in the pre-created track determined for the participant. For example, the event path generator 402 selects sessions A, B, C, and D for a particular participant. Meanwhile, the event path generator 402 determines a pre-created track including sessions A, C, D, and E for the particular participant. The event path generator 402 then determines a customized track for the user including sessions A, C, and D as required sessions, and sessions B and E as alternative sessions that the user can attend either one. The event path generator 402 can also determine the track for the user including A, C, and D, if that meets the requirement for the particular participant by the event host.

The event path generator 402 can track the progress of the participant on the recommended sessions and generate a progress report. The progress report can include an overview of the progress in view of a requirement for the participant. The progress report can also include a completion status for each recommended session. Some examples of completion statuses include "completed," "missed," "not started yet," "exited with 40% done," "currently attending," and any other suitable status that indicate the progress of the participant on a session. The progress report can be display in a GUI. Alternatively, or additionally, the progress report can be sent to the participant via text message, email, or any other means.

The event path generator 402 can also include an indication engine 408 for generating indications about up-next sessions for participants in a current session. The indication engine 408 identify one or more up-next sessions from the session recommendations 406 based on the current session a participant is attending. In some examples, the session recommendations 406 include alternative sessions at a specific time interval. The indication engine 408 can include all the up-next alternative sessions in an up-next session indication. Alternatively, the indication engine 408 can select one alternative session to include in the up-next session indication. In some examples, the indication engine 408 scores all the up-next alternative sessions based on up-to-date participant data 352, for example participant behavior data related to the recommended sessions before all the alternative up-next sessions in the session recommendations 406. For example, if one alternative up-next session has the same presenter as the session that the participant skipped or did not finish, that alternative up-next session may have a lower score than other alternative up-next sessions. Also, as an example, if one up-next session has a similar description to the session that the participant attended or is attending, that alternative up-next session may have a lower score than other up-next alternative sessions. The indication engine 408 can select the session with the highest score among all the alternative up-next sessions to include in the up-next session indication 410 to the participant.

In some examples, the indication engine 408 creates a GUI element to present the up-next session indication 410. The GUI element is transmitted to the GUI of a client device associated with the participant for display. In some examples, the indication engine 408 generates a notification message to present the up-next session indication to the participant. The notification message can be a chat message or a popup message to the participant in a GUI for the virtual event (e.g., a GUI of a virtual event lobby). The notification message can be in text, in audio, or in any suitable format that can be generated by the indication engine 408. Alternatively, the notification message can be a short message service (SMS) text to the participant's mobile device, an email message, or in any other suitable means. The up-next session indication 410 can include a start-time of an up-next session, a location of the up-next session, a title of the up-next session, and a link to the up-next session. The up-next session indication 410, which can be different formats, can be transmitted to the client device before an end timepoint of a current session attended by the participant. The up-next session indication 410 can be displayed for a predetermined time period. For example, it can be displayed from 5 minutes before the end of a current session to 5 minutes after the up-next session is started. The participant may be a virtual participant using the virtual conference application provided by the virtual conference provider for attending virtual sessions. The participant may be an on-site participant using the virtual conference application provided by the virtual conference provider attending a corresponding virtual session for an on-site session the on-site participant is attending. The virtual conference application may be in a companion mode. When the virtual conference application is in companion mode, the video and audio streams are turned off since the participant is on-site, but the participant can still access other features, such as chats, polls, closed captions, interpretation, and notification of up-next sessions, of the virtual session corresponding to the on-site session. The participant may be an on-site participant not joining the corresponding virtual session via the virtual conference application provided by the virtual conference provider 340. The on-site participant can still receive the indication of up-next session via text message, or email, or any other suitable means. The session recommendations 406 and the up-next session indications 410 can also be stored in the data store 350.

In some examples, the event path generator 402 is also configured to dynamically route participants to different locations for an event or a session of the event. For example, for a hybrid session of an event, the event path generator 402 generates a recommendation of the on-site session to a number of on-site participants. The event path generator 402 can adjust the number so that it does not go beyond capacity of the on-site location nor much lower than the capacity of the on-site location, for example a conference room or event hall. In the event that the actual number of participants going to the on-site session is beyond capacity of the on-site location, the event path generator 402 can reroute a subgroup of participants to an overflow room based on availability via an updated indication of the up-next session. The event path generator 402 can identify the subgroup of participants based on the participant data, for example expressed interests in networking with participants of certain backgrounds. Alternatively, or additionally, the event path generator 402 can change the location of the on-site session to a different location of bigger capacity based on availability via an updated indication of the up-next session.

In addition, the event path generator 402 can be integrated with external ancillary services, such as transportation (e.g., taxi, ride sharing, shuttles) or catering service. For example, when the event path generator 402 provides an indication of the up-next session to a participant and the up-next session is an on-site session at a location different from the main event location, the event path generator 402 can also include transportation information in the indication, such as the shuttle schedule, where to get a taxi, or a link to book a ride. As another example, when the number of participants for the on-site event is beyond capacity, the event path generator 402 can notify the catering service of the updated number of participants and the updated location.

Figure 5:
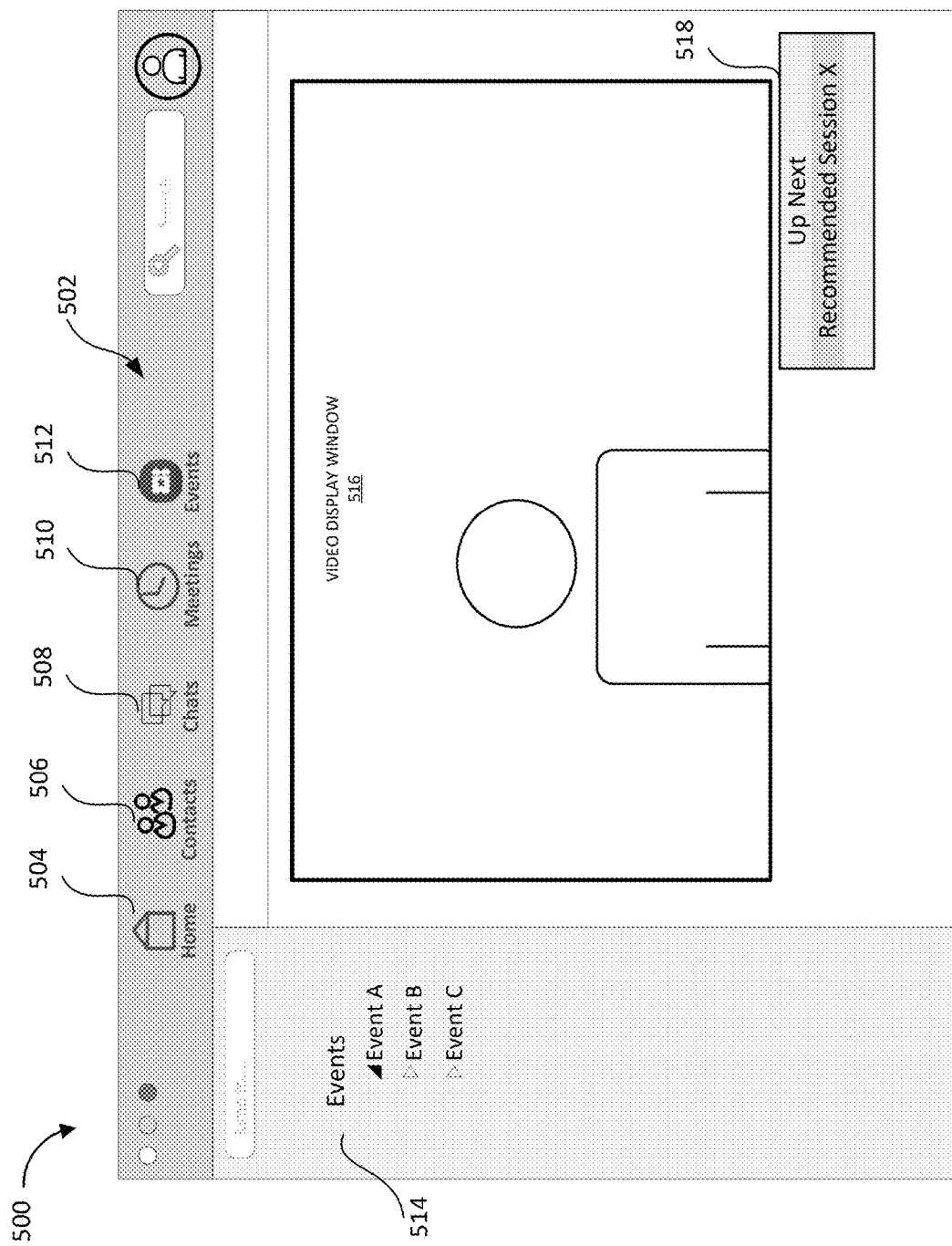
FIG. 5 shows an example graphical user interface (GUI) of a virtual conference application for an event displaying an up-next session indication in a GUI element.

Referring now to FIG. 5, FIG. 5 shows an example GUI 500 of a virtual conference application for an event displaying an up-next session indication in a GUI element. The virtual conference application is provided by the virtual conference provider 340 and installed on a client device 310. In this example, the GUI 500 of the virtual conference application includes a dashboard 502 displaying buttons for different functions, such as home page button 504, contacts button 506, chats button 508, meetings button 510, and events button 512. When the events button 512 is activated, a list of scheduled events 514 for a participant is displayed on the left bar of the GUI 500. In this example, the list of schedule events 514 includes Event A, Event B, and Event C. The participant is current attending Event A. The video display window 516 is displaying a current session of event A that the participant is attending. A GUI element 518 presents an indication of an up-next session toward the end of the current session. In this example, the indication of up-next session includes information about a recommended session X. When the GUI element 518 is activated by being clicked by the participant, the video display window 516 can automatically direct to the recommended up-next session X.

Figure 6:
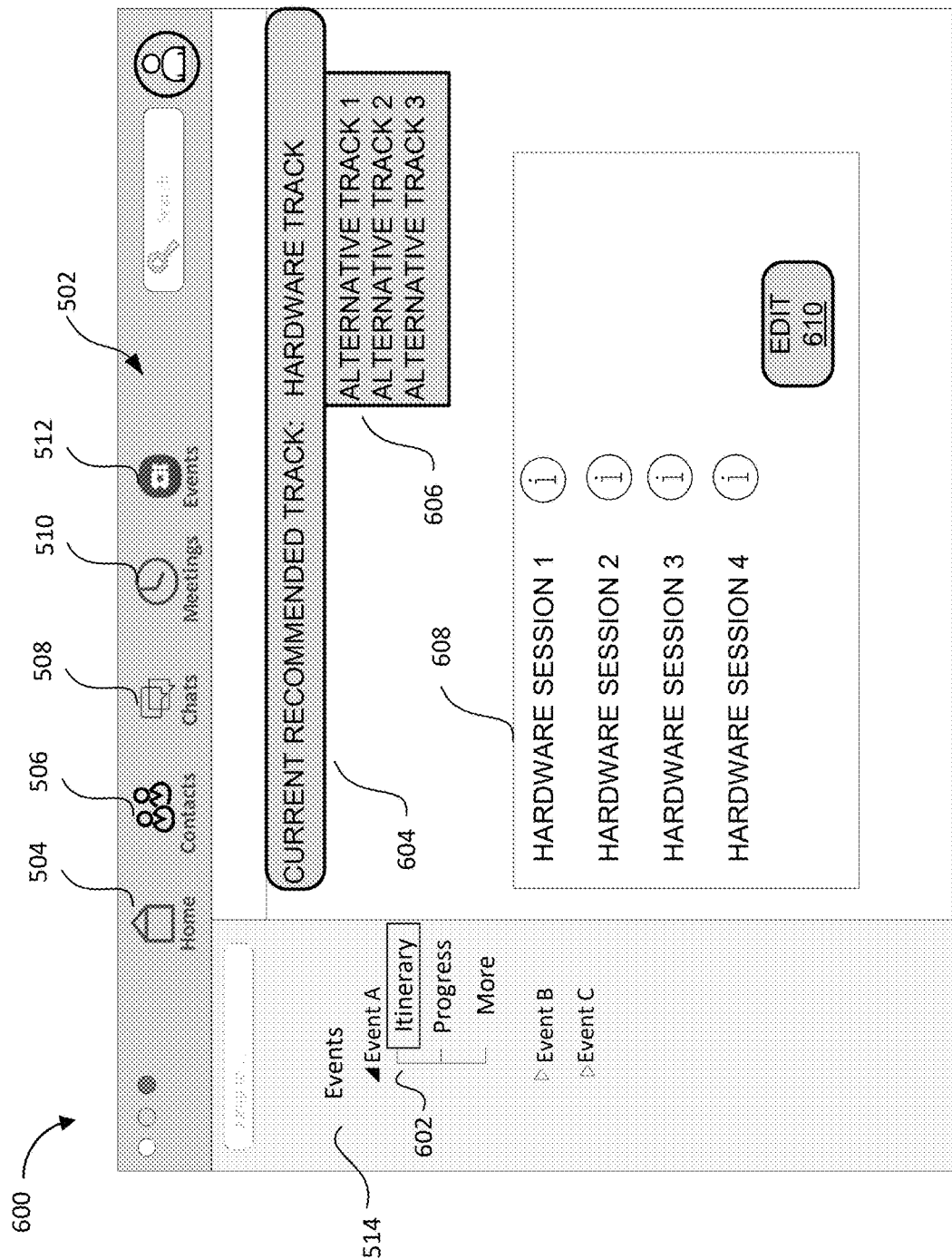
FIG. 6 shows an example GUI displaying an event path for a participant attending an event.

Referring now to FIG. 6, FIG. 6 shows an example GUI 600 displaying an itinerary for a participant attending an event. The itinerary is an event path including a list of recommended sessions for the participant. In this example, the participant is attending Event A. The GUI 600 provides a list of options 602 regarding Event A, including itinerary, progress, and any other suitable options for Event A. When the itinerary option is selected, the current recommended track 604 is displayed. There can be different lists of recommended sessions for different participant groups. The different lists of recommended sessions provide different tracks for the different participant groups. The different lists of recommended sessions (or tracks) can be pre-created by the event host or at the request of the event host for different participant groups by the event path generator 402. Alternatively, the different lists of recommended sessions (or tracks) are customized for individual users by the event path generator 402.

The GUI 600 also enables the participant to switch to alternative tracks 606, for example alternative track 1, alternative track 2, and alternative track 3. In this example, the current recommended track 604 for the participant is hardware track. The hardware track indicates the participant is in a participant group which is interested in hardware related sessions. The hardware track includes a list of recommended hardware sessions 608, such as hardware session 1, hardware session 2, hardware session 3, and hardware session 4, and information related to corresponding sessions. The list of recommended hardware session 608 can be edited. When an edit button 610 is activated, one or more recommended hardware sessions may be removed from or added to the list of recommended hardware sessions 608. The event path generator 402 can recommend more hardware related sessions to replace the deleted session or add more session upon the participant's request.

Figure 7:
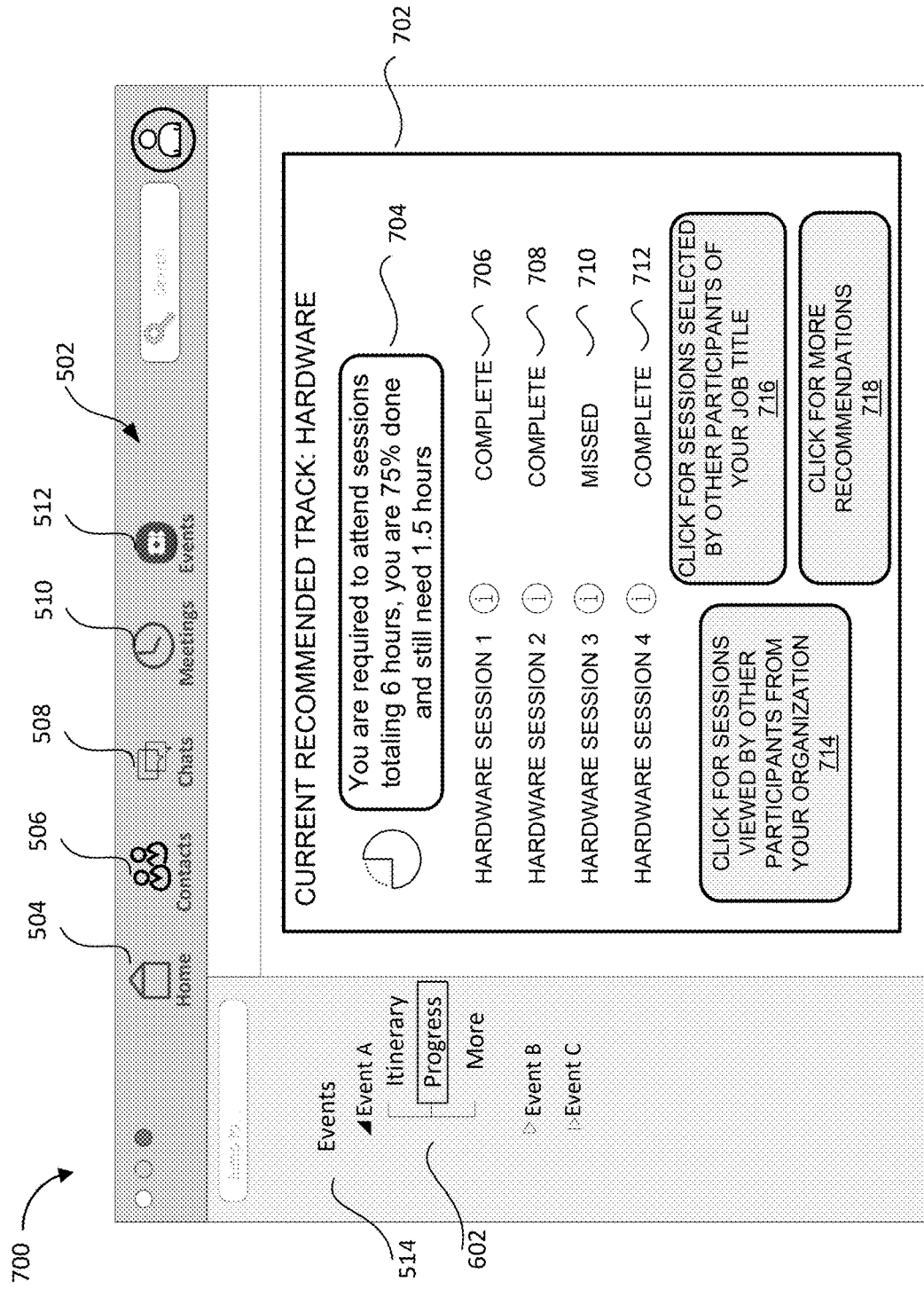
FIG. 7 shows an example GUI displaying a progress report for a participant attending an event.

Referring now to FIG. 7, FIG. 7 shows an example GUI 700 displaying a progress report 702 for a participant attending an event. In this example, the current recommended track for the participant is hardware track. The progress report 702 provides an overview 704 of the participant's progress for the hardware track. The overview 704 provides information about the requirements for the participant, how much the participant has finished, and how much has yet to be done (if there is any) for satisfying the requirement. In this example, the participant is required to attend sessions totaling 6 hours, the participant has done 75% (4.5 hours), and the participant still needs 1.5 hours to satisfy the requirement. The progress report 702 also includes a completion status of each recommended session of the hardware track for the participant. For example, the status 706 for hardware session is complete, the status 708 for hardware session 2 is complete, the status 710 of hardware session 3 is missed, and the status 712 for hardware session 4 is complete. Besides, the status of a recommended session can also be "not started yet," "started but not finished," "currently attending," and any other suitable status that indicate the progress of the participant on a session. For any missed sessions, the progress report may provide a link for on-demand replay for completing the session. In addition, the virtual conference provider 340 can provide sessions viewed by other participants from the participant's organization for the participant to select. For example, when the button 714 is activated, a request for these sessions is transmitted to the virtual conference provider 340. The virtual conference provider 340 can collect the information about the sessions viewed by other participants from the participant's organization and provide to the participant. The sessions that are viewed by other participants from the participant's organization can also be displayed in the GUI 700 automatically. Similarly, the virtual conference provider 340 can also provide sessions viewed by other participants of the participant's title for the participant to select. The participant can click a button 716 to view the information about these sessions. The sessions that are viewed by other participants of the participant's title can also be displayed in the GUI 700 automatically. Alternatively, or additionally, the participant can click a button 718 for more session recommendations. When the button 718 is activated, a request for new recommendations is transmitted to the virtual conference provider 340. The virtual conference provider 340 can generate more recommendations based on up-to-date participant data 352 and event data 354. That means, the virtual conference provider 340 may not recommend sessions that have completed by the participant. The virtual conference provider 340 may recommended sessions that were ended before a request for new recommendations is transmitted, by providing a replay link if the session is recorded.

Figure 8:
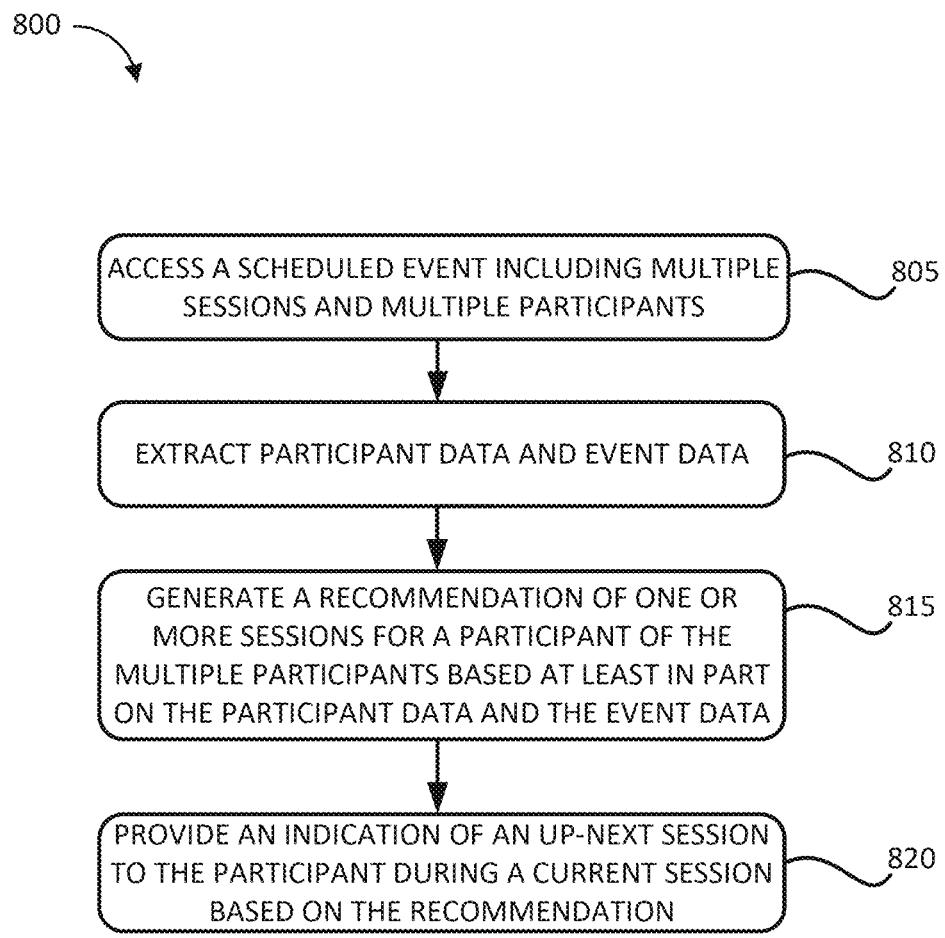
FIG. 8 shows an example method of generating an event path for a participant of an event.

Referring now to FIG. 8, FIG. 8 shows an example method of generating an event path for a participant of an event. The example method 800 will be discussed with respect to the system 400 shown in FIG. 4; however, any suitable system for generating an event path for an event participant may be used.

At block 805, a virtual conference provider 340 accesses a scheduled event including multiple sessions and multiple participants. An event host can schedule an event with a virtual conference provider 340 via a virtual conference application. The event can include multiple sessions scheduled at different times in a day or on different days. Multiple participants can register to attend the event. in some examples, the event is totally virtual. That is, all the sessions of the event are provided via the virtual conference provider 340. In some examples, the event is a hybrid event. That is, some or all of the sessions of the event are held on-site, and meanwhile provide virtual access via the virtual conference provider 340.

At block 810, the virtual conference provider 340 extracts participant data 352 and event data 354. In some examples, an event is scheduled with the virtual conference provider 340, either virtual of hybrid, the virtual conference provider 340 is permitted to extract the participant data 352 and event data 354. The participant data 352 and the event data 354 are generally as described above with respect to FIG. 4. For example, the participant data 352 includes participant profile data related to the scheduled event or historical events, participant behavior data related to the scheduled event or historical events, or external data related to the multiple participants from one or more external sources. For example, the event data 354 includes presenter data associated with the multiple sessions, titles of the multiple sessions, scheduled times of the multiple sessions, descriptions of the multiple sessions, and locations of the multiple sessions.

At block 815, the virtual conference provider 340 generates a recommendation of one or more sessions for a participant of the multiple participants based at least in part on the participant data 352 and the event data 354. As discussed above with respect to FIG. 4, in this example the virtual conference provider 340 includes an event path generator 402. The event path generator 402 can implement a machine-learning model 404 to generate a recommendation of one or more sessions for a participant using the participant data 352 and the event data 354. In some examples, the event path generator 402 groups the multiple participants into certain participant groups based on participant data 352. The event path generator 402 can then generate a recommendation of one or more sessions for a participant group. There can be multiple lists of recommended sessions, which can be referred to as different itineraries or tracks, for corresponding participant groups. The event path generator 402 may assign one itinerary or track to a participant based on the participant group the participant belongs to. The participant can switch to a different itinerary or track from the original assigned itinerary or track.

The event path generator 402 can also track a participant's progress on the one or more recommended sessions, for example, the completion status of the one or more recommended sessions. Some examples of completion statuses include "not started yet," "currently attending 70% done," "missed," or "completed." The event path generator 402 can compare the progress of the one or more recommended sessions to a threshold value. The threshold value can be a requirement for the participant, for example, 8 hours of participation. The event path generator 402 can generate a progress report for the participant, including an overall progress in comparison to the threshold value, and the completion status of each recommended session.

At block 820, the virtual conference provider 340 provides an up-next session indication 410 to the participant during a current session based on the recommendation. The indication can be provided for a predetermined period of time before an end timepoint of the current session, for example 5 minutes before the current session ends. In some examples, the indication of the up-next session can still be provided to the participant after the current session is finished and before the up-next session starts. In some examples, the indication of the up-next session can still be provided to the participant for a period of time after the up-next session starts (e.g., the first 5 minutes of the up-next session). The indication of the up-next session can include a start-time of the up-next session, a location of the up-next session (virtual link or on-site location), and a title of the up-next session.

In some examples, the current session is a virtual session, the up-next recommended session is also virtual. The indication of the up-next session can be displayed on a GUI of a participant device where the current session is streaming. For example, the indication of the up-next session can be presented in a floating window at the bottom right corner of a display window streaming the current session. In some examples, the current session is an on-site session, the indication of the up-next session can be a text message or an email including the information of the up-next session, whether the up-next session is virtual or on-site. When the up-next session is virtual, the text message may include a link to the up-next session. Alternatively, or additionally, the current session is a hybrid session, the participant joined the virtual component of the current session via a virtual conference application in a companion mode while attending the on-site component of the current session. The indication of the up-next session can be a notification message popping up in the companion mode. If the up-next session is a virtual session only, the participant may click the notification message to join the up-next session.

In some examples, the event path generator 402 dynamically updates the recommendation of the one or more session based on updated participant data or update event data. Correspondingly, the event path generator 402 dynamically updates the indication of the up-next session based on the updated recommendation.

Figure 9:
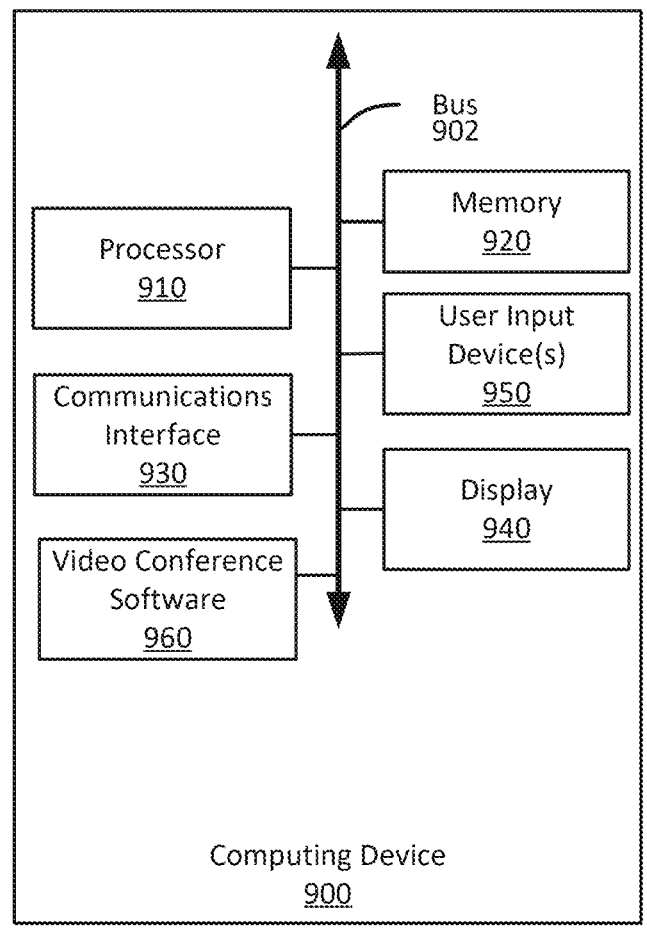
FIG. 9 shows an example computing device suitable for use with example systems and methods for generating event paths for participants of virtual or hybrid events.

Referring now to FIG. 9, FIG. 9 shows an example computing device 900 suitable for use in example systems or methods for generating event paths for participants of virtual or hybrid events, according to this disclosure. The example computing device 900 includes a processor 910 which is in communication with the memory 920 and other components of the computing device 900 using one or more communications buses 902. The processor 910 is configured to execute processor-executable instructions stored in the memory 920 to perform one or more methods for generating event paths for participants of virtual or hybrid events, according to different examples, such as part or all of the example method 800 described above with respect to FIG. 8. In some embodiments, the computing device may include software 960 for executing one or more methods described herein, such as for example, one or more steps of methods 800. The computing device 900, in this example, also includes one or more user input devices 950, such as a keyboard, mouse, touchscreen, microphone, etc., to accept user input. The computing device 900 also includes a display 940 to provide visual output to a user.

In addition, the computing device 900 includes a virtual conference software 960 to enable a user to join and participate in one or more virtual or hybrid events, by receiving multimedia streams from a virtual conference provider, sending multimedia streams to the virtual conference provider, joining and leaving breakout rooms, interacting with other participants via chats, interacting with hosts via polls, receiving session recommendations, and receiving indications of up-next sessions, such as described throughout this disclosure, etc.

The computing device 900 also includes a communications interface 930. In some examples, the communications interface 930 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random-access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteris- That which is claimed is:

1. A method comprising:
   accessing, by a virtual conference application executed by a virtual conference provider, a scheduled event, wherein the scheduled event comprises a plurality of sessions, wherein a plurality of participants are associated with the scheduled event;
   extracting participant data and event data associated with the scheduled event;
   generating a recommendation of one or more sessions for a participant of the plurality of participants based at least in part on the participant data, the event data, and a threshold value representing a participation requirement;
   providing an indication of an up-next session to the participant of the plurality of participants during a current session based on the recommendation of the one or more sessions;
   tracking a completion status of the one or more sessions recommended for the participant;
   comparing the completion status of the one or more sessions to the threshold value to generate comparison data; and
   generating a progress report for a participant of the plurality of participants comprising the completion status, the threshold value, and the comparison data.

2. The method of claim 1, wherein the participant data comprises participant profile data for the scheduled event, participant behavior data for the scheduled event, historical profile data for historical events, historical behavior data for historical events, or external data associated with the plurality of participants, wherein the participant profile data comprises organization, title, occupation, and location, wherein the participant behavior data comprises participant comments, reviews, signup channels, or progresses related to the scheduled event or historical events, and wherein the external data comprises participant data retrieved from one or more external sources.

3. The method of claim 1, wherein the event data comprises presenter data associated with the plurality of sessions, titles of the plurality of sessions, scheduled times of the plurality of sessions, descriptions of the plurality of sessions, or locations of the plurality of sessions.

4. The method of claim 1, wherein the recommendation of one or more sessions is generated using a machine learning model, wherein the machine learning model is trained using a training data set comprising baseline event data, baseline participant data, and baseline completion status data.

5. The method of claim 1, further comprising:
   grouping the plurality of participants based on the participant data to create multiple participant groups; and
   generating multiple recommendations for the multiple participant groups respectively, each of the multiple recommendations comprising at least one session.

6. The method of claim 5, further comprising:
   assigning a recommendation of the multiple recommendations to the participant based on a participant group of the multiple participant groups to which the participant is grouped.

7. The method of claim 1, further comprising:
   causing the indication to be displayed on a graphical user interface (GUI), wherein the GUI comprises a GUI element presenting the indication of the up-next session for a predetermined time period from a first timepoint before an end of a current session attended by a particular participant to a second timepoint after the end of the current session.

8. The method of claim 1, wherein the indication of the up-next session comprises a start-time of the up-next session, a location of the up-next session, and a title of the up-next session.

9. The method of claim 1, further comprising:
   dynamically updating the recommendation of the one or more sessions based on updated participant data or updated event data to generate an updated recommendation comprising one or more updated sessions; and
   dynamically updating the indication of the up-next session based on the updated recommendation.

10. A system comprising:
    a communications interface;
    a non-transitory computer-readable medium; and
    one or more processors communicatively coupled to the communications interface and the non-transitory computer-readable medium, the one or more processors configured to execute processor-executable instructions stored in the non-transitory computer-readable medium to:
    access, by a virtual conference application executed by a virtual conference provider, a scheduled event, wherein the scheduled event comprises a plurality of sessions, wherein a plurality of participants are associated with the scheduled event;
    extract participant data and event data associated with the scheduled event;
    generate a recommendation of one or more sessions for a participant of the plurality of participants based at least in part on the participant data, the A event data, and a threshold value representing a participation requirement;
    provide an indication of an up-next session to the participant of the plurality of participants during a current session based on the recommendation of the one or more sessions;
    track a completion status of the one or more sessions recommended for the participant;
    compare the completion status of the one or more sessions to the threshold value to generate comparison data; and
    generate a progress report for a participant of the plurality of participants comprising the completion status, the threshold value, and the comparison data.

11. The system of claim 10, wherein the one or more processors are configured to execute further processor-executable instructions stored in the non-transitory computer-readable medium to:
    group the plurality of participants based on the participant data to create multiple participant groups; and
    generate multiple recommendations for the multiple participant groups respectively, each of the multiple recommendations comprising at least one session.

12. The system of claim 10, wherein the one or more processors are configured to execute further processor-executable instructions stored in the non-transitory computer-readable medium to:
cause the indication to be displayed on a graphical user interface (GUI), wherein the GUI comprises a GUI element presenting the indication of the up-next session for a predetermined time period from a first timepoint before an end of a current session attended by a particular participant to a second timepoint after the end of the current session, and wherein the indication of the up-next session comprises a start-time of the up-next session, a location of the up-next session, and a title of the up-next session.

13. The system of claim 10, wherein the one or more processors are configured to execute further processor-executable instructions stored in the non-transitory computer-readable medium to:
dynamically update the recommendation of the one or more sessions based on updated participant data or updated event data to generate an updated recommendation comprising one or more updated sessions; and
dynamically update the indication of the up-next session based on the updated recommendation.

14. A non-transitory computer-readable medium comprising processor-executable instructions configured to cause one or more processors to:
access, by a virtual conference application executed by a virtual conference provider, a scheduled event, wherein the scheduled event comprises a plurality of sessions, wherein a plurality of participants are associated with the scheduled event;
extract participant data and event data associated with the scheduled event;
generate a recommendation of one or more sessions for a participant of the plurality of participants based at least in part on the participant data, the event data, and a threshold value representing a participation requirement;
provide an indication of an up-next session to the participant of the plurality of participants during a current session based on the recommendation of the one or more sessions;
track a completion status of the one or more sessions recommended for the participant;
compare the completion status of the one or more sessions to the threshold value to generate comparison data; and
generate a progress report for a participant of the plurality of participants comprising the completion status, the threshold value, and the comparison data.

15. The non-transitory computer-readable medium of claim 14, wherein the recommendation of one or more sessions is generated using a machine learning model, wherein the machine learning model is trained using a training data set comprising baseline event data, baseline participant data, and baseline completion status data.

16. The non-transitory computer-readable medium of claim 4, further comprising processor-executable instructions configured to cause one or more processors to:
dynamically update the recommendation of the one or more sessions based on updated participant data or updated event data to generate an updated recommendation comprising one or more updated sessions; and
dynamically update the indication of the up-next session based on the updated recommendation.

\* \* \* \* \*